United States Patent
Paley et al.

(10) Patent No.: US 10,836,848 B2
(45) Date of Patent: Nov. 17, 2020

(54) METHOD FOR OBTAINING A REAGENT TO REDUCE THE HYDRODYNAMIC RESISTANCE OF A TURBULENT FLOW OF LIQUID HYDROCARBONS IN PIPELINES

(71) Applicant: «MIRRICO» Limited Liability Company, Moscow (RU)

(72) Inventors: Ruslan Vladimirovich Paley, Kazan (RU); Igor Aleksandrovich Malykhin, Moscow (RU)

(73) Assignee: «MIRRICO» Limited Liability Company, Moscow (RU)

( * ) Notice: Subject to any disclaimer, the term of this patent is extended or adjusted under 35 U.S.C. 154(b) by 129 days.

(21) Appl. No.: 16/304,846

(22) PCT Filed: Sep. 29, 2017

(86) PCT No.: PCT/RU2017/000723
§ 371 (c)(1),
(2) Date: Nov. 27, 2018

(87) PCT Pub. No.: WO2018/217122
PCT Pub. Date: Nov. 29, 2018

(65) Prior Publication Data
US 2020/0247921 A1    Aug. 6, 2020

(30) Foreign Application Priority Data
May 24, 2017 (RU) .................... 2017118108

(51) Int. Cl.
C08F 10/14 (2006.01)
C08J 3/12 (2006.01)
C10L 1/16 (2006.01)

(52) U.S. Cl.
CPC ............ C08F 10/14 (2013.01); C08J 3/12 (2013.01); C10L 1/1641 (2013.01); C08J 2323/20 (2013.01)

(58) Field of Classification Search
CPC .......... C08F 10/14; C08J 3/12; C08J 2323/20; C10L 1/1641
USPC ........................................................ 526/154
See application file for complete search history.

(56) References Cited

U.S. PATENT DOCUMENTS

| | | |
|---|---|---|
| 4,415,714 A | 11/1983 | Mack |
| 4,527,581 A | 7/1985 | Motier |
| 4,845,178 A | 7/1989 | Hostetler et al. |
| 5,449,732 A * | 9/1995 | Smith et al. .................. 526/128 |
| 5,539,044 A | 7/1996 | Dindi et al. |
| 6,160,036 A | 12/2000 | Kommareddi et al. |
| 6,576,732 B1 | 6/2003 | Milligan et al. |
| 6,649,670 B1 | 11/2003 | Harris |
| 6,765,053 B2 | 7/2004 | Labude et al. |
| 6,894,088 B2 | 5/2005 | Motier et al. |
| 7,015,290 B2 | 3/2006 | Kommareddi et al. |
| 2006/0276766 A1 | 12/2006 | Kentolall |
| 2006/0293196 A1 | 12/2006 | Harris et al. |
| 2007/0021531 A1 | 10/2007 | Motier |

FOREIGN PATENT DOCUMENTS

| | | |
|---|---|---|
| EP | 2757142 A1 | 7/2014 |
| RU | 2238282 C1 | 10/2004 |
| RU | 2443720 C2 | 2/2012 |
| RU | 2487138 C1 | 7/2013 |
| RU | 2579583 C1 | 4/2016 |
| RU | 2579588 C1 | 4/2016 |
| RU | 2599245 C1 | 10/2016 |

* cited by examiner

*Primary Examiner* — William K Cheung
(74) *Attorney, Agent, or Firm* — Nadya Reingand; Yan Hankin

(57) ABSTRACT

The invention relates to inorganic and polymeric reagents and namely to pipeline transfer of petroleum and petroleum products. The method of production of a reagent for reduction of hydrodynamic resistance of liquid hydrocarbon flow in pipelines includes polymerization of C6-C14 alpha-olefins over catalyst and catalyst activator. Polymerization of C6-C14 alpha-olefins is conducted in the monomer medium with addition from 0.1 to 5 w/w of a saturated alicyclic hydrocarbon of C8-C32 composition and a saturated aliphatic hydrocarbon of C6-C18 composition subject to conversion of monomers from 96.0 to 99.5 w/w, using microspheric titanium trichloride as a catalyst, and a mixture of diethylaluminum chloride and triisobutylaluminum with weight ratio from 1:10 to 10:1 as a catalyst activator. Then a polymer with molecular weight more than $10^7$ atomic mass unit with narrow molecular weight distribution not more than 1.5 with the set ratio of components is produced. Then the polymer is being ground.

6 Claims, No Drawings

METHOD FOR OBTAINING A REAGENT TO REDUCE THE HYDRODYNAMIC RESISTANCE OF A TURBULENT FLOW OF LIQUID HYDROCARBONS IN PIPELINES

CROSS REFERENCE TO RELATED APPLICATIONS

The present patent application is a National stage application of the PCT application PCT/RU2017/000723 filed Sep. 29, 2017, which claims priority to Russian patent application RU 2017118108 filed May 24, 2017, which is currently issued as a patent RU 2648079, the publication date is Mar. 22, 2018.

FIELD OF INVENTION

The invention relates to inorganic and polymeric chemicals and namely to pipeline transfer of petroleum and petroleum products.

BACKGROUND

It is widely known due the prior level of invention that the addition to the turbulent flow of the piped oil or hydrocarbon liquid, for example oil or diesel fuel, polymer materials creating a temporary high viscous near-wall layer on the inner surface of the pipeline, which can reduce flow disturbances in a given pipeline zone, results in increasing of the pipe capacity and reduction of energy costs for transport. Due to the ability to show these properties in hydrocarbon liquid at very small volumes (10-50 min$^{-1}$), extra-high molecular polyalphaolefins are the most effective and used in industry. The polymer is delivered to the transportation lines in the form of highly concentrated (from 20 to 50% weight per weight (w/w)) suspension with a dispersed particle size in the range of 50-500 μm in the solvent not solving the polymer, as the dispersion medium, which makes it possible to reduce essentially the viscosity of the solution delivered to the pipeline subject to saving high content of a polymer in it.

The effectiveness of the chemical to reduce the hydrodynamic resistance of the turbulent flow is explained by the properties of molecular structures formed as a result of gradual dissolution of extra-high molecular polyalphaolefins in the pumped liquid. The polymer dissolves with forming of associates of polymer molecules and hydrocarbon liquid. The latter orient in the liquid moving along the wall of the pipeline due to their high viscosity and density and, thus, show target anti-turbulent effect. Control of the rate of formation and degradation of polyalphaolefin-solvent associates at the molecular level makes it possible to select the most effective chemical for specific conditions and characteristics of the pipeline, such as the transported hydrocarbon liquid. The most widely used methods to achieve this goal are methods of synthethis of polyalphaolefins with maximal molecular weight for the proposed conditions of polymerization process through variation of the chain length of an initial monomer (U.S. Pat. No. 4,527,581 A, 7, Sep. 1985), with polymerization conditions (U.S. Pat. No. 6,160,036 B2, 12 Dec. 2000; U.S. Pat. No. 6,649,670 B2, 18 Nov. 2003; RU 2443720 C2, 27 Feb. 2012, the type and quantitative ratio of a catalyst and cocatalysts (U.S. Pat. No. 4,415,714 a, 15 Nov. 1983, U.S. Pat. No. 4,845,178 a, 4 Jul. 1989), followed by selection of methods and conditions of polymer dispersing (U.S. Pat. No. 6,765,053 B2, Jul. 20, 2004; U.S. Pat. No. 6,160,036 B2, 12 Dec. 2000; RU 2463320 C1, 10 Oct. 2012, RU 2481357 C1, 10 May 2013 g) in a specific dispersion medium (non-solvent) (U.S. Pat. No. 6,894,088 B2, 17 May 2005; RU 2579583 C1 and RU 2579588C1, 10 Apr. 2016 g) over adhesion reducing powders and/or homogenizing additives (U.S. Pat. No. 5,539,044 a, 23 Jul. 1996; EP 2757142 A1, 23 Jul. 2014 g; US 2002/0173569 A1, 11 Dec. 2002) with production of polymer particles with a different size and morphology (US 2006/0276566 A1, 7 Dec. 2006; US 2006/0293196 A1, Dec. 28, 2006; US 2007/0021531 A1, Jan. 25, 2007).

Thus, it is more of a problem to produce an effective polyalphaolefin polymer, which can be processed into a commodity form of a turbulent viscosity reducing additive subject to saving of low cost of the final chemical. This problem can be solved by creation of an efficient method for production of a polymer with the required properties at high conversion values of raw monomer feedstock. However, the resulting polymer should have high and optimal molecular weight, which is more than $10^7$ atomic mass unit, a certain spatial structure, sufficient dissolution rate in the transported liquid at the appropriate temperature in the pipeline, should be easy processed into a commodity form, that is a suspension with a particle size of 50-500 μm, stable at a wide temperature range of different climatic zones, from −50° C. to +50° C. The most preferable method in our view is the proposed method of block polymerization of alpha-olefins using titanium trichloride as a catalyst with addition to the reaction medium of spatial structure modifiers in the form of higher cyclic alkanes, which can form a pseudo-mechanical linkage with polymer molecules at the late polymerization stages, along with giving specific properties to the polymer produced in such a way. It is known that in the event that conversion exceeds 20-25% w/w at the late stages of cationic polymerization of alpha-olefins in the process of block polymerization, fractions of a polymer with less molecular weight are formed in comparison with the initial reaction stages (see U.S. Pat. No. 4,415,714, Nov. 15, 1983, U.S. Pat. No. 4,433,123, Feb. 21, 1984, U.S. Pat. No. 5,449,732, Sep. 12, 1995).

The proposed new components in the form of higher carbocyclic compounds make it possible to form intermolecular associates at late stages of cationic polymerization of alpha-olefins and so to increase the content of the polymer fractions, which ensure occurrence of the target anti-turbulent effect.

There is a known method for production of a polymer reducing the hydrodynamic resistance of hydrocarbon liquid flow disclosed in U.S. Pat. No. 7,015,290 B2, 21 Mar. 2006. In case of implementation of this method a polymer is produced by polymerization in a monomer weight by means of Ziegler-Natta catalysts in the demountable heterogeneous reactor with the expanded surface area to remove the released heat. This method comprises polymerization of alpha-olefins, namely: hexene-1, octene-1, decene-1, dodecene-1, tetradecene-1, hexadecene-1 and mixtures of them, using as a cocatalyst compounds of trialkylaluminum or dialkylaluminumchlorides, namely triethylaluminum, triisobutylaluminum, diisobutylaluminum chloride, and mixtures of them, if the heat removal surface area is at least 75% of the total reaction mass. A significant disadvantage of this method is conducting of a process at high rate of polymerization subject to large amounts of a catalyst, the use of demountable reactors with a complex structure, which require careful preparation and which involve considerable difficulties of collection and adding of monomers, low conversion values of a monomer as compared to the stated method.

There is a known method for production of a polymer reducing the hydrodynamic resistance of hydrocarbon liquid flow. In case of implementation of this method polyalphaolefins are produced by solution polymerization by means of Ziegler-Natta catalysts in the jacketed reactor (see patent U.S. Pat. No. 4,289,679 A, 15 Sep. 1981).

This method has the following disadvantages: low concentration of the produced polymer in the solution, energy-consuming separation of the polymer from the solution, large amount of waste.

There is a known method for production of extra-high molecular polyalphaolefins, which includes polymerization of C6-C30 alpha-olefins over the product of recovery of tetrachloridetitaniumaluminum by an organic compound as a catalyst and a complex based on 3-tia-1,5-diazabicyclo [3.2.1]octane-dimethylaluminumchloride as a cocatalyst. A molar ratio of the chemicals is α-olefin, catalyst 0.002-0.004, cocatalyst 0.02-0.04. The reaction of polymerization is held at the range of temperatures from −20° C. to +20° C. during 8-12 hours (see patent RU 2487138 C1, 10 Jul. 2013).

A disadvantage of this method is the use of increased amounts of organoaluminums, which results in significant decrease in solubility of the produced polymer in hydrocarbon liquids, especially at low temperatures. The C30 higher alpha-olefins in C6 (70%)/C30 (30%) monomeric feedstock are solid and practically do not participate in polymerization subject to stated values of the polymerization temperature (−20° C.). The polymer produced according to this method cannot be processed into a thin suspension with a polymer concentration above 25 w/w.

There is a known method for production of the polymer including preparation of a finely divided polymer soluble in hydrocarbon liquids. The polymer is synthesized by (co) polymerization of higher alpha-olefins under the action of the Ziegler-Natta catalyst. The product of block polymerization is used as a (co)polymer of higher alpha-olefins. The thin polymer dispersion is produced by thermal reprecipitation of the polymer in liquid, which is a non-solvent for the polymer at ambient temperature and can dissolve it at an elevated temperature (see RU 2481357 C1, May 10, 2013).

The disadvantages of this method of the polymer production are low preparation of a commodity form, significant energy consuming, loss of the spatial structure of the polymer in case of transition into a solution at elevated temperatures, necessary increase of dosages of additives produced in such a way for saving of proper effectiveness.

There is a known method for production of extra-high molecular polyalphaolefins, which includes production of polymers reducing the hydrodynamic resistance of hydrocarbon liquid flow by polymerization of monomers C6-C16 en masse by means of Ziegler-Natta catalysts and cocatalysts that is chloride trialkylaluminum and chloride dialkylaluminum in polymer bags (see patent U.S. Pat. No. 6,576, 732 B1, 10 Jun. 2003).

This method has the following disadvantages: the use of large amounts of catalysts and cocatalysts, broad molecular weight distribution, moderate conversion of monomers, presence of polymer fractions with lower molecular weight of $1\text{-}5\times 10^6$ atomic mass unit, which results in the use of preferably cryogenic grinding in presence of significant amounts of adhesion reducing powders and increased amounts of highly polar non-solvents (water and methanol) as a dispersion medium.

The most similar method as to the essence and achieved technical result is a method for production of a chemical for reduction of hydrodynamic resistance of liquid hydrocarbon flow in pipelines including polymerization of C6-C14 alpha-olefins over catalyst and catalyst activator, the polymerization of C6-C14 alpha-olefins is implemented in the monomer medium with addition of a saturated aliphatic hydrocarbon of C6-C18 composition subject to monomer conversion from 96.0 to 99.5 w/w using microspheric titanium trichloride as a catalyst, and a mixture with weight ratio of diethylaluminum chloride and triisobutylaluminum 1:10 to 10:1 as a catalyst activator, as a result of which a polymer with molecular weight more than 107 atomic mass unit with narrow molecular-weight distribution not more than 1.5 is produced, after which the polymer is ground preparing as a result a commodity form of the chemical for reduction of hydrodynamic resistance of liquid hydrocarbon flow in pipelines (see RU 2599245 C1, 10 Oct. 2016).

A significant difference between the stated method and the prototype is the use of saturated cyclic hydrocarbons of C8-C32 composition, which facilitate forming of intermolecular associates at the late stages of polymerization subject to low reaction rates, as a result of which the efficiency of the polymer lower dosages added to the transported hydrocarbon liquid is increased.

SUMMARY

The object of the invention is to provide a method for production of a chemical for reduction of hydrodynamic resistance of liquid hydrocarbon flow in pipelines with the required properties at high conversion values of the initial monomer feedstock and high content of polymer fractions, which show a target anti-turbulent effect in the final product.

This object is achieved due to the fact that the method of production of a chemical for reduction of hydrodynamic resistance of liquid hydrocarbon flow in pipelines comprises:

conducting the polymerization of C6-C14 alpha-olefins over a catalyst and a catalyst activator, wherein the polymerization of C6-C14 alpha-olefins is conducted in a monomer medium with an addition from 0.1 to 5 w/w of a saturated alicyclic hydrocarbon of C8-C32 composition and a saturated aliphatic hydrocarbon of C6-C18 composition subject to conversion of monomers from 96.0 to 99.5 w/w, using microspheric titanium trichloride as a catalyst, and a mixture of diethylaluminum chloride and triisobutylaluminum with a weight ratio from 1:10 to 10:1 as a catalyst activator, which results in production of a polymer with a molecular weight more than $10^7$ atomic mass unit with narrow molecular weight distribution not more than 1.5 with the following ratio of components, w/w:

| | |
|---|---|
| C6-C14 alpha-olefin | 75-97 |
| titanium trichloride | 0.001-0.015 |
| diethylaluminum chloride | 0.007-0.07 |
| triisobutylaluminum | 0.007-0.07 |
| saturated alicyclic hydrocarbon of C8-C32 composition | 0.1-5.0 |
| saturated aliphatic hydrocarbon of C6-C18 composition | other, | and grinding the polymer to prepare a commodity form of the chemical for reduction of hydrodynamic resistance of turbulent liquid hydrocarbon flow in pipelines.

The polymerization of C6-C14 alpha-olefins is carried out at a temperature from −10° C. to +20° C. for 15 to 30 days in a particular embodiment.

The polymerization of C6-C14 alpha-olefins is carried out in the monomer medium such that the polymer is produced in the form of a layer having a thickness not more than 250 mm, in another particular embodiment.

The polymerization of C6-C14 alpha-olefins is carried out in sealed containers with polyethylene liners in one more embodiment.

It is expedient that the polymer is ground to particles from 0.1 to 1.5 mm by mechanical cutting devices in a non-solvent medium for the polymer in the presence of an adhesion reducing powder not more than 5% w/w and to particles, which are from 0.05 to 1.0 mm by means of cryogenic mills in the presence of an adhesion reducing powder not more than 10% w/w and further mixed with the non-solvent medium for the polymer.

The technical result achieved in particular embodiment of the stated invention represents a chemical reducing hydrodynamic resistance of turbulent liquid hydrocarbon flow in the pipelines and as a result increasing the pipeline capacity and reducing the transportation costs of the hydrocarbon liquid.

DETAILED DESCRIPTION OF THE PREFERRED EMBODIMENT

This section describes the most preferred embodiment of the invention, which, however, does not exclude other possible embodiments clearly defined in the materials of the application and clear for a specialist.

The method of production of a chemical for reduction of hydrodynamic resistance of turbulent liquid hydrocarbon flow in pipelines is implemented in the following most preferred manner.

The polymerization of C6-C14 alpha-olefins is carried out in the monomer medium under the action of a Ziegler-Natta catalyst, which is used as microspheroidal titanium trichloride and a mixture of triisobutylaluminum diethylaluminum chloride with weight ratio from 1:10 to 10:1 as a catalyst activator with addition of a saturated aliphatic hydrocarbon facilitating migration of the residual monomer at the late stages of the reaction and saturated alicyclic hydrocarbon facilitating formation of a specific spatial structure in the tanks, in which the temperature in the range from −10° C. to plus 20° C. is maintained and which prevent the access of air for 15 to 30 days at layer thickness of the reaction mixture not more than 250 mm.

This method includes production of polymer of extra-high molecular polyalphaolefins having a molecular weight 1.107-2.107 atomic mass unit with molecular weight distribution less than 1.5, conversion above 96% w/w, which makes it possible to reduce the energy consumption for grinding during production of polymer dispersions at a concentration more than 25% w/w in the non-solvent for turbulent viscosity reducing additives, to protect the polymer from mechanical destruction in the process of mechanical or cryogenic grinding, to reduce the polymer content of dispersions and maintain their high efficiency, to reduce substantially the price cost of chemicals based on the produced polymer of extra-high molecular polyalphaolefins, as well as a chemical for reduction of hydrodynamic resistance of piped oil and petroleum products based on this polymer.

According to the stated method the polymerization is conducted in any apparatus designed for mixing liquid feed streams, which provides heat removal at 6×104 kJ/(ton·hour) and isolation of the reaction mass from air, for example in a jacketed reactor with a mixer, a flow reactor, equipped with a system of nitrogen gas purging with purity not less than 99.9% w/w. After conduct of polymerization for at least 1 hour from the beginning of mixing of all components in case of conduct of the process in the jacketed reactor with a mixer or circulation in the flow reactor, the reaction mass is transferred to tanks for completion of polymerization under conditions with controlled temperature not more than +20° C., preventing access of air for at least 15 days as well. The polymer blocks produced in such a way are ground in the required size using suitable mechanical or cryogenic grinding equipment.

The C6-C14 alpha-olefins, preferably hex-1-ene, oct-1-ene, dec-1-ene, dodec-1-ene, tetradec-1-ene and their mixtures, most preferably hex-1-ene, dec-1-ene, dodec-1-ene and their mixtures containing a basic alpha-olefin in an amount of at least 70% w/w are used as monomers.

Microspherical titanium trichloride produced from titanium tetrachloride and triethylaluminum is used as a catalyst, for example, in production of catalysts by Polipropilen plant of OOO Tomskneftekhim, city of Tomsk (the Russian Federation), W. R. Grace (the USA) or a similar commercially available catalyst.

The mixtures of diethylaluminum chloride and triisobutylaluminum with weight ratio from 1:10 to 10:1 are used as a catalyst activator. These chemicals are commercially available, for example, by AkzoNobel N.V. (Netherlands) or OAO Redkinsky Pilot Plant (the Russian Federation) and others.

The saturated alicyclic hydrocarbon of C8-C32 composition can be cyclic alkanes or a mixture of cyclic alkanes produced by cyclization of the relevant cyclo olefins, for example in the reaction of metathesis cyclization and/or molecular condensation and highly purified by distillation (not less than 99.9% w/w of total cycloalkanes), for example: cyclooctane, cyclooctyloctane, cyclotetradecane, cyclohexadecane, cyclooctadecane, cyclohexadecyl cyclohexadecane, etc.

An alkane or a mixture of alkanes with molecular weight from 86 atomic mass unit to 254 atomic mass unit produced by distillation of oil and purified to 99.9% w/w is used as a saturated aliphatic hydrocarbon of C6-C18 composition.

The containers for final stage polymerization can be made of organoaluminum-inert materials, for example, in the form of glass and glazed containers, tight metal containers or boxes, polymer containers, multi-layer polymer bags. It is mostly preferable to use tight metal containers with polyethylene liners. The polyethylene liners should be made of several, most preferably five, layers of polyethylene film, with at least one layer as a barrier for oxygen. A film made of polyvinyl acetate, polyvinyl alcohol, metal polyethylene can be used as a barrier layer.

Mixtures of monohydric and polyhydric alcohols, their ethers and water are used as a solvent not solving the polymer. The mixture of components is selected in such a way that its density would be same as the density of extra-high molecular polyalphaolefins produced by polymerization.

Calcium stearate, ethylene distearamide, lauryl alcohol, water, vegetable oil are used as adhesion reducing powder.

The apparatus for grinding of rubber blocks by Pallmann Maschinenfabrik GmbH & Co. KG (Germany), OOO Sibprommash (the Russian Federation, Novosibirsk) or similar apparatus can be used for mechanical grinding and homogenizers by Kinematica AG (Switzerland), IKA-WERKE GmbH & Co. KG (Germany), extruders by Krauss Maffei Berstorff AG (Germany) or similar apparatus can be used for fine grinding.

The apparatus by Hosokawa Alpine AG (Germany), Cimma Inc. (Italy), Pallmann Maschinenfabrik GmbH&Co. KG (Germany) or similar apparatus can be used for cryogenic grinding.

The method for production of a chemical for reduction of hydrodynamic resistance of liquid hydrocarbon flow in pipelines is explained by the following examples.

Example 1 (Similar to RU 2599245)

A jacketed reactor with a mixer, thermocouple, manometer, delivery of nitrogen gas 99.9% w/w is filled with hexane-1 in an amount of 90% w/w, tetradecene-1 in an amount of 5% w/w, dodecane with a purity not less than 99.8% w/w in an amount of 4.91% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0338% w/w of each) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and stearamide at the ratio 8:1.95:0.05 w/w producing a chemical for reduction of hydrodynamic resistance of the flow of oil and petroleum products in pipelines, that is a stable fine dispersion with a polymer content of 30±20%.

Example 2

A jacketed reactor with a mixer, thermocouple, manometer, delivery of nitrogen gas 99.9% w/w is filled with hexane-1 in an amount of 75 w/w, decene-1 in an amount of 10% w/w, decalin with a purity not less than 99.8% w/w in an amount of 11.91% w/w, cyclooctadecane with a purity not less than 99.8% w/w in an amount of 3.00% w/w. The mixture in the reactor is cooled in the nitrogen flow to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0338% w/w of each) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and calcium stearate at the ratio 8:1.95:0.05 w/w producing a chemical for reduction of hydrodynamic resistance of the flow of oil and petroleum products in pipelines, that is a stable fine dispersion with a polymer content of 30±20%.

Example 3

A jacketed reactor with a mixer, thermocouple, manometer, delivery of nitrogen gas 99.9% w/w is filled with hexane-1 in an amount of 84% w/w, tetradecene-1 in an amount of 5% w/w, dodecane with a purity not less than 99.8% w/w in an amount of 5.91% w/w, cyclooctane with a purity not less than 99.8% w/w in an amount of 5.00% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0338% w/w of each) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and ethylene stearamide at the ratio 8:1.45:0.05 w/w producing a chemical for reduction of hydrodynamic resistance of the flow of oil and petroleum products in pipelines, that is a stable fine dispersion with a polymer content of 30±20%.

Example 4

A jacketed reactor with a mixer, thermocouple, manometer, delivery of nitrogen gas 99.9% w/w is filled with hexane-1 in an amount of 80% w/w, decene-1 in an amount of 5% w/w, decalin with a purity not less than 99.8% w/w in an amount of 14.81% w/w, cyclooctadecylcyclooctadecane with a purity not less than 99.8% w/w in an amount of 0.1% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 10:1 in an amount of 0.077% w/w (by 0.07% w/w and 0.007% w/w pro tanto) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and calcium stearate at the ratio 8:1.95:0.05 w/w producing a chemical for reduction of hydrodynamic resistance of the flow of oil and petroleum products in pipelines, that is a stable fine dispersion with a polymer content of 30±20%.

Example 5

A jacketed reactor with a mixer, thermocouple, manometer, delivery of nitrogen gas 99.9% w/w is filled with hexane-1 in an amount of 80% w/w, decene-1 in an amount of 5% w/w, decane with a purity not less than 99.8% w/w in an amount of 12.91% w/w, cyclohexadecane with a purity not less than 99.7% w/w in an amount of 2.00% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:10 in an amount of 0.077% w/w (by 0.007% w/w and 0.07% w/w pro tanto) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and calcium stearate at the ratio 8:1.95:0.05 w/w producing a chemical for reduction of hydrodynamic resistance of the flow of oil and petroleum products in pipelines, that is a stable fine dispersion with a polymer content of 30±20%.

Example 6

A jacketed reactor with a mixer, thermocouple, manometer, delivery of nitrogen gas 99.9% w/w is filled with octene-1 in an amount of 80% w/w, hexene-1 in an amount of 15% w/w, decane with a purity not less than 99.8% w/w in an amount of 2.91% w/w, cyclotetradecylcyclohexadecane with a purity not less than 99.8% w/w in an amount of 2.00% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0385% w/w of each) and a catalyst, that is titanium trichloride is delivered in an amount of 0.013% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of n-butanol, ethylene glycol, water and ethylene distearamide at the ratio 8:0.95:1:0.05 w/w producing a chemical for reduction of hydrodynamic resistance of the flow of oil and petroleum products in pipelines, that is a stable fine dispersion with a polymer content of 30±20%.

Example 7

A jacketed reactor with a mixer, thermocouple, manometer, delivery of nitrogen gas 99.9% w/w is filled with hexene-1 in an amount of 70% w/w, dodecene-1 in an amount of 5% w/w, hexadecane with a purity not less than 99.8% w/w in an amount of 19.908% w/w, cyclooctane with a purity not less than 99.8% w/w in an amount of 5.00 w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0385% w/w of each) and a catalyst, that is titanium trichloride is delivered in an amount of 0.015% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of n-butanol, ethylene glycol and calcium stearate at the ratio 9.0:0.97:0.03 w/w producing a chemical for reduction of hydrodynamic resistance of the flow of oil and petroleum products in pipelines, that is a stable fine dispersion with a polymer content of 30±20%.

Example 8

A jacketed reactor with a mixer, thermocouple, manometer, delivery of nitrogen gas 99.9% w/w is filled with dodecene-1 in an amount of 90% w/w, decene-1 in an amount of 5% w/w, decane with a purity not less than 99.8% w/w in an amount of 2.92% w/w, cyclohexadecane with a purity not less than 99.8% w/w in an amount of 2.00% w/w. The mixture in the reactor is cooled to +10±2° C. by mixing with a mixer and delivery of a coolant into the jacket of the reactor. Then a catalyst activator is delivered to the reactor as a mixture of diethylaluminum chloride and triisobutylaluminum with weight ratio 1:1 in an amount of 0.077% w/w (by 0.0385% w/w of each) and a catalyst, that is titanium trichloride is delivered in an amount of 0.003% w/w in the form of suspension with a concentration 40% w/w in heptane. The contents of the reactor is mixed maintaining the temperature in the range from +8° C. to +12° C. for 1 hour. Then the reaction mass is discharged in the nitrogen flow into gas-tight containers with polyethylene liners so that the height of the mass layer does not exceed 250 mm or similar-sized polymer containers, closed tightly and kept at a temperature of 15±5° C. for at least 15 days without access of air. The produced polymer blocks are ground subsequently with a cascade of knife mills into particles 50±40 mm, 3±2 mm and 0.8±0.7 mm. The final grinding is performed in the solvent medium consisting of a mixture of isopropanol, ethylene glycol and calcium stearate at the ratio 8:1.97:0.03 w/w producing a chemical for reduction of hydrodynamic resistance of the flow of oil and petroleum products in pipelines, that is a stable fine dispersion with a polymer content of 30±20%.

The efficiency of the manufactured products was assessed by means of the laboratory turbulent flow meter (see Table). Decrease of hydrodynamic resistance (DR) to motion of oil solvent in the capillary in the presence of the chemical was calculated according to the following formula:

$$DR = \frac{\lambda_0 - \lambda_0}{\lambda_0} = \frac{t_0^2 - t_P^2}{t_0^2};$$

where
$\lambda$ is a coefficient of liquid resistance;
t is time of flow of 330 cm$^3$ of the oil solvent through the capillary;
o and p are indices pertaining to the pure solvent and chemical solution pro tanto.

The product is considered to pass the test if the DR value makes no less than 30% subject to concentration of the chemical in the solvent making 2.5 min-1.

TABLE

| Example No. | Conversion, w/w | Polymer concentration in the chemical, w/w | DR value, %, subject to concentration of the chemical in the solvent making 2.5 mln$^{-1}$ | Chemical freezing point, °C. (GOST 20287) |
|---|---|---|---|---|
| Example 1, analogue | 98.0 | 30 | 42.0 | −60 |
| Example 2 | 98.5 | 18 | 41.0 | −65 |
| Example 3 | 98.0 | 18 | 40.0 | −65 |
| Example 4 | 97.0 | 18 | 44.0 | −65 |
| Example 5 | 98.5 | 18 | 41.0 | −65 |
| Example 6 | 98.0 | 18 | 44.0 | −65 |
| Example 7 | 99.0 | 18 | 43.0 | −65 |
| Example 8 | 98.5 | 18 | 42.0 | −65 |

As can be seen from the above and as it follows from the given examples and the Table, inference should be drawn that the stated method compared to similar ones, including the most similar method, makes it possible to produce a chemical, which reduces to the fullest extent possible hydrodynamic resistance of turbulent liquid hydrocarbon flow in pipelines as well as to increase the pipe capacity and reduce energy costs for transport of the hydrocarbon liquid.

What is claimed is:

1. A method for obtaining a reagent to reduce a hydrodynamic resistance of a turbulent flow of liquid hydrocarbons in pipelines, comprising:
conducting the polymerization of C6-C14 alpha-olefins over a catalyst and a catalyst activator, wherein the polymerization of C6-C14 alpha-olefins is conducted in a monomer medium with an addition from 0.1 to 5 weight per weight (w/w) of a saturated alicyclic hydrocarbon of C8-C32 composition and a saturated aliphatic hydrocarbon of C6-C18 composition subject to conversion of monomers from 96.0 to 99.5 w/w, using microspheric titanium trichloride as the catalyst, and a mixture of diethylaluminum chloride and triisobutylaluminum with a weight ratio from 1:10 to 10:1 as the catalyst activator, which results in production of a polymer with a molecular weight more than 10$^7$ atomic mass unit with a narrow molecular weight distribution not more than 1.5 with a following ratio of components, w/w:

| | |
|---|---|
| C6-C14 alpha-olefin | 75-97 |
| titanium trichloride | 0.001-0.015 |
| diethylaluminum chloride | 0.007-0.07 |
| triisobutylaluminum | 0.007-0.07 |
| saturated alicyclic hydrocarbon of C8-C32 composition | 0.1-5.0 |
| saturated aliphatic hydrocarbon of C6-C18 composition | other; | and
grinding the polymer to prepare a commodity form of the reagent for reduction of the hydrodynamic resistance of turbulent liquid hydrocarbon flow in pipelines, wherein the sum of all components equal to 100.

2. The method according to claim 1, wherein said conducting comprises conducting the polymerization of C6-C14 alpha-olefins at a temperature from −10° C. to +20° C. for 15 to 30 days.

3. The method according to claim 1, wherein
said conducting comprises conducting the polymerization of C6-C14 alpha-olefins in the monomer medium such that the polymer is produced in the form of a layer having a thickness not more than 250 mm.

4. The method according to claim 1, wherein said conducting comprises conducting the polymerization of C6-C14 alpha-olefins in tight containers with polyethylene liners.

5. The method according to claim 1, wherein said grinding comprises grinding the polymer to particles from 0.1 to 1.5 mm by means of mechanical cutting devices in a non-solvent medium for the polymer in a presence of not more than 10% w/w of an adhesion reducing powder.

6. The method according to claim 1, wherein said grinding comprises grinding the polymer to particles from 0.05 to 1.0 mm by means of cryogenic mills in a presence of not more than 15% w/w of an adhesion reducing powder and then is mixed with a non-solvent medium for the polymer.

* * * * *